United States Patent [19]
Ozaki et al.

[11] Patent Number: 5,973,060
[45] Date of Patent: Oct. 26, 1999

[54] SILICONE RUBBER PARTICULATE COMPOSITION AND METHODS FOR THE PREPARATION THEREOF

[75] Inventors: Kouichi Ozaki, Chiba; Norio Matsuda, Sakai-gun; Makoto Tanoue, Chiba; Toyohiko Yamadera, Chiba; Mitsuo Hamada, Chiba, all of Japan

[73] Assignee: Dow Corning Toray Silicone Co., Ltd., Tokyo, Japan

[21] Appl. No.: 09/245,517

[22] Filed: Feb. 5, 1999

[30] Foreign Application Priority Data

Feb. 10, 1998 [JP] Japan .................. 10-044359

[51] Int. Cl.⁶ .................. C08L 83/00; C08J 9/28
[52] U.S. Cl. .................. 524/506; 521/84.1; 521/134; 521/149; 521/154; 524/588
[58] Field of Search .................. 524/588, 506; 521/84.1, 134, 154, 149

[56] References Cited

FOREIGN PATENT DOCUMENTS 63-077942  5/1988  Japan .
63-202658  8/1988  Japan .

*Primary Examiner*—Morton Foelak
*Attorney, Agent, or Firm*—Alex Weitz

[57] ABSTRACT

A silicone rubber particulate composition useful as an additive for cosmetics, rubbers, resins and paints is disclosed, said composition comprising:

(A) a silicone rubber particulate having an average particle size of 0.1 to 1,000 $\mu$m;

(B) a water-absorptive resin particulate having a water-free average particle size of 0.1 to 1,000 $\mu$m; and (C) water, wherein said component (B) is present at a level of 0.01 to 5 weight percent measured on a water-free basis relative to component (A) and said water is present at a level of 10 to 10,000 weight parts for each 100 weight parts of component (B).

2 Claims, No Drawings

SILICONE RUBBER PARTICULATE COMPOSITION AND METHODS FOR THE PREPARATION THEREOF

FIELD OF THE INVENTION

This invention relates to a low-charging silicone rubber particulate composition that generates little static electricity. The invention also relates to methods for the preparation of this silicone rubber particulate composition.

BACKGROUND OF THE INVENTION

Silicone rubber microparticulates are known to have a number of desirable features, such as an excellent heat resistance, cold resistance, weathering resistance, lubricity, water repellency, release performance, liquid absorptivity, and stress-relaxation performance. This has led to a wide diversification in their types and to their use as property modifiers in a number of fields. Silicone rubber particulates can be prepared, for example, by cryopulverizing solid silicone rubber using a grinder or by curing an emulsified liquid silicone rubber composition and removing the water from the resulting aqueous dispersion of silicone rubber particulate to isolate the silicone rubber particulate (refer to Japanese Patent Application Laid Open Numbers Hei 63-202658 (202658/1988) and Hei 63-77942 (77942/1988)). In the case of the latter method, it has been advantageous for the purpose of inhibiting aggregation of the silicone rubber particulate to remove the water by drying in a hot gas current. This approach, however, is known to be encumbered by the following problems: (i) the generation of static electricity has required the implementation of countermeasures for dust explosions, and (ii) drying in a hot gas current has also required large amounts of electrical energy. Another problem is the high cost of the equipment for inhibiting the negative effects on the human body and the dust explosions that can be caused by the generation of static and the increased degree of charging that occur when a silicone rubber particulate is fluidized at its point of use.

SUMMARY OF THE INVENTION

An object of the present invention is to provide a low-charging silicone rubber particulate composition that generates little static electricity. An additional object of the present invention is to provide simple methods for the preparation of this silicone rubber particulate composition.

The aforesaid objects can be accomplished by a silicone rubber particulate composition comprising:

(A) silicone rubber particulate with an average particle size of 0.1 to 1,000 μm, (B) highly water-absorptive resin particulate whose average particle size in the absence of water absorption is from 0.1 to 1,000 μm, and (C) water wherein component (B) is present at from 0.01 to 5 weight % calculated as the water-free component (B) relative to component (A) and component (C) is contained in component (B) at from 10 to 10,000 weight parts for each 100 weight parts component (B). The aforesaid objects are also accomplished by a method for the preparation of the aforesaid silicone rubber particulate composition that is characterized by mixing component (B), in a proportion of 0.01 to 5 weight % calculated as the water-free component (B) relative to component (A), into the water-based dispersion of a silicone rubber particulate comprising components (A) and (C) (component (C) being present at from 10 to 10,000 weight parts per 100 weight parts component (B)) to produce a state in which free water is not present.

The aforesaid objects are also accomplished by a method for the preparation of the silicone rubber particulate composition that is characterized by mixing component (A), component (B) in a proportion of 0.01 to 5 weight % calculated as the water-free component (B) relative to component (A), and component (C) in a proportion of 10 to 10,000 weight parts per 100 weight parts component (B).

DETAILED DESCRIPTION OF THE INVENTION

To explain the preceding in greater detail, the silicone rubber particulate (A) used in the present invention has an average particle size of 0.1 to 1,000 μm and preferably of 0.5 to 50 μm. For the purposes of the present invention, the average particle size refers to a number average based on the major particle dimension. The preparation of silicone rubber particulate with an average particle size less than 0.1 μm is highly problematic, while there are almost no uses for silicone rubber particulate with an average particle size in excess of 1,000 μm. This silicone rubber particulate will typically have a spherical shape, but the morphology is not critical and an irregular morphology can be used. The silicone rubber making up the instant silicone rubber particulate is not critical. This silicone rubber can be exemplified by (i) the condensation-cured silicone rubbers afforded by the condensation reaction, in the presence of a condensation catalyst, between a silanol-endblocked diorganopolysiloxane and an organohydrogenpolysiloxane bearing at least 3 silicon-bonded hydrogen atoms in each molecule, (ii) the addition-cured silicone rubbers afforded by the platinum-catalyzed addition reaction between a diorganopolysiloxane bearing at least 2 alkenyl groups in each molecule and an organohydrogenpolysiloxane bearing at least 2 silicon-bonded hydrogen atoms in each molecule, and (iii) the radical reaction-cured silicone rubbers afforded by heating a diorganopolysiloxane bearing vinyl group in pendant position and/or at both molecular chain terminals in the presence of an organoperoxide. The former two types are preferred for the present invention from the perspective of ease of preparation. The silicone rubber particulate (A) is preferably prepared employing a water-based dispersion, as follows.

Component (A) may be prepared by first preparing an addition-curing liquid silicone rubber composition comprising platinum catalyst, a liquid diorganopolysiloxane bearing at least 2 alkenyl groups, (e.g., vinyl), in each molecule, and an organohydrogenpolysiloxane bearing at least 2 silicon-bonded hydrogen atoms in each molecule. This composition is introduced into water alone or into surfactant-containing water and a water-based dispersion or emulsion of the liquid silicone rubber composition is produced by stirring. This water-based dispersion or emulsion is then allowed to stand or is heated to effect cure of the liquid silicone rubber composition directly into a particulate form. As an alternative, the dispersion or emulsion can itself be dispersed into water residing at ≧25° C. to effect cure of the liquid silicone rubber composition directly into particulate form.

Component (A) may also be prepared by first preparing a condensation-curing liquid silicone rubber composition comprising a condensation reaction catalyst (for example, organotin compound catalysts, platinum catalysts), a silanol-endblocked diorganopolysiloxane, and an organohydrogenpolysiloxane bearing at least 3 silicon-bonded hydrogen atoms in each molecule. This composition is introduced into water alone or into surfactant-containing water and a water-based dispersion or emulsion of the liquid silicone rubber composition is produced by stirring. This water-based dispersion or emulsion is then allowed to stand or is heated to effect cure of the liquid silicone rubber composition directly into a particulate form. As an alternative, the dispersion or emulsion can itself be dispersed into water residing at $\geq 25°$ C. to effect cure of the liquid silicone rubber composition directly into particulate form.

Component (A) may also contain those components typically employed in silicone rubbers, for example, silanol-endblocked diorganosiloxane oligomer, vinyl-functional branched organopolysiloxane, fumed silica, wet-process silica, heat stabilizers, flame retardants, pigments, carbon black, and silicone oil.

Component (A) can be a silicone rubber particulate as afforded by the removal of water from the above-described water-based dispersion of a silicone rubber particulate, or by spraying the solution or emulsion of a liquid silicone rubber composition into a hot gas current, or by the cryopulverization of a solid silicone rubber using a grinder.

The highly water-absorptive resin particulate (B), by its dispersion in component (A) and absorption of water, functions to inhibit static generation and charging by component (A). Component (B) in a water-free state has an average particle size of 0.1 to 1,000 $\mu$m and preferably of 0.5 to 500 $\mu$m and is admixed at a level of 0.01 to 5 weight %, preferably 0.1 to 2 weight %, in each case with reference to component (A). That is, the weight of (B) is 0.01 to 5 times the weight of (A)/100. Use of less than 0.01 weight % of (B) results in such a small amount of held water that the ability to prevent static generation and charging is substantially impaired. The use of more than 5 weight % of (B) has such negative effects as impairing the fluidity of the silicone rubber particulate composition and compromising, for example, the heat resistance, lubricity, and release performance that are the characteristic features of silicone rubber particulates. This highly water-absorptive resin particulate (B) is a resin afforded by making a water-soluble polymer water insoluble by crosslinking, graft polymerization, crystallization, or the like, and should have the ability to rapidly absorb large amounts of water with swelling and gelation. The morphology of component (B) can be irregular, spherical, short fibrous, or scale-like. Its water-absorption capacity should as a general rule be from 300 to 1,500 grams water per gram of polymer resin when measured with deionized water. Examples of a synthetic component (B) are polyacrylic acid types, polyacrylonitrile types, acrylate salt-vinyl alcohol copolymer types, and acrylate salt-acrylamide copolymer types. Examples of a semi-synthetic component (B) are carboxylmethylcellulose types, starch-polyacrylonitrile types, and the crosslinked products of starch-polyacrylate salt graft copolymers.

The water (C) used in the present invention, through its absorption into component (B), functions to inhibit static generation and charging by the silicone rubber particulate. The type of water is not critical as long as it is clean, and component (C) can be exemplified by tapwater, well water, ion-exchanged water, and distilled water. Component (C) should be admixed at a level of 10 to 10,000 weight parts, preferably 100 to 2,500 weight parts, in each case per 100 weight parts component (B). The use of less than 10 weight parts of water per 100 weight parts component (B) fails to give a satisfactory inhibition of static generation and charging. The use of more than 10,000 weight parts of (C) per 100 weight parts (B) has a negative impact on such properties as the uniformity and fluidity of the mixture of components (A) and (B).

The particulate composition comprising components (A), (B), and (C) can be prepared, for example, by introducing a prescribed quantity of the highly water-absorptive resin particulate (B) and a prescribed quantity of a dispersion of the silicone rubber particulate (A) in the water (C), or prescribed quantities of the silicone rubber particulate (A), highly water-absorptive resin particulate (B), and water (C), into a high-speed stirred mixer and mixing by stirring for a prescribed period of time. The mixer used for this purpose is preferably a blade-type high-speed agitator, for example, a Henschel mixer, speed mixer, ball cutter, circulating cutter mixer, power mixer, hybrid mixer, combination mixer, or dynomixer. However, a blade-type medium-speed, vertical-axle mixer can also be used, for example, a kitchen mixer, Nauta mixer, High Sludger, or ball mixer. The mixer itself is not critical as long as it is capable of producing a uniform and flowable mixture comprising the silicone rubber particulate and water-loaded highly water-absorptive resin particulate. The silicone rubber particulate composition prepared as described above is useful as an additive for those cosmetics, rubbers, thermoplastic resins, thermosetting resins, paints, and lustrants that employ silicone rubber particulates, and is also useful as a surface treatment agent for various structural members.

EXAMPLES

The invention will be explained in greater detail hereinbelow using working examples, in which parts denotes weight parts, % denotes weight %, and the values reported for viscosity were measured at 25° C.

The properties of the silicone rubber particulate compositions were measured using the following conditions.

Amount of static electricity: The lid of the mixer was opened and the amount of static electricity was measured using a static potential meter (from Kasuga Kabushiki Kaisha) at a distance of 9 cm from the silicone rubber particulate composition.

Water content: A sample of approximately 5 g was collected and measured using an electronic infrared-type water meter (from Shimadzu Seisakusho Kabushiki Kaisha). The measurement conditions were 105° C. and 30 minutes.

Bulk density: A 100 cc sample was placed in a cylinder with an inside diameter of 45 mm and a height of 63 mm. The weight was measured without tapping and the bulk density was then calculated.

Appearance: By visual inspection.

Example 1

One hundred parts of Torayfil™ E506 (spherical silicone rubber powder from Dow Corning Toray Silicone Company, Limited, Japan) with an average particle size of 5 $\mu$m, 0.1 part of Sanfresh™ ST-500MPS (highly water-absorptive resin from Sanyo Kasei Kogyo Kabushiki Kaisha consisting of the powder of a crosslinked starch-acrylate salt graft copolymer) with a main particle size of 20 to 50 $\mu$m (i.e., 80% of the particles in this range), and 0.2 part of water were placed in a 20-L super mixer (from Kabushiki Kaisha Kawata) and mixed for 10 minutes at an agitator rotation rate of 2,000 rpm. The lid of the mixer was then immediately opened, the amount of static electricity was measured and the appearance was inspected. These results are reported in Table 1.

Comparative Example 1

Only the silicone rubber powder described in Example 1 was placed in the super mixer. Mixing was carried out under the same conditions as in Example 1, after which the mixer lid was immediately opened and the amount of static electricity was measured and the appearance was inspected. These results are also reported in Table 1.

Comparative Example 2

The silicone rubber powder described in Example 1 and the highly water-absorptive resin powder described in Example 1 were placed in the super mixer and mixed under the same conditions as in Example 1. The mixer lid was then immediately opened and the amount of static electricity was measured and the appearance was inspected. These results are reported in Table 1.

TABLE 1

| sample no. | Example 1 1 | Comparative Example 2 2 | Comparative 3 |
|---|---|---|---|
| silicone rubber powder (parts) | 100 | 100 | 100 |
| highly water-absorptive resin powder (parts) | 0.1 | 0 | 0.1 |
| water (parts) | 0.2 | 0 | 0 |
| static electricity (kV) | −0.3 | −5.0 | −0.8 |
| appearance | flowable white powder | flowable white powder | flowable white powder |

Examples 2 to 4

One hundred parts of dimethylvinylsiloxy-endblocked dimethylpolysiloxane with a viscosity of 0.5 Pa.sec (vinyl content=0.5%) and 6.0 parts of trimethylsiloxy-endblocked methylhydrogenpolysiloxane with a viscosity of 0.01 Pa.sec were introduced into a mixer and mixed and the mixture was then cooled to 0° C. (mixture A). One hundred parts of dimethylpolysiloxane as described above and 0.6 part of isopropanolic chloroplatinic acid solution (platinum content=3%) were then introduced into a mixer and mixed and the mixture was thereafter cooled (mixture B). Above mixtures A and B were metered out at a 1:1 weight ratio and were transported through a static mixer using a gear pump and thereby mixed to homogeneity (mixture C). One hundred parts of mixture C was delivered to a colloid mill (Manton-Gaulin Co.) and 11 parts of ion-exchanged water containing 1.5% surfactant (ethylene oxide adduct of trimethylnonanol) was added at the same time. Milling was carried out at 5,000 rpm across a 0.1 mm gap to yield an emulsion of a liquid silicone rubber composition. This emulsion was aged at room temperature for 24 hours to give a water-based dispersion of silicone rubber powder. This water-based dispersion (111 parts) and 0.5 or 1.0 part highly water-absorptive resin particulate as described in Example 1 were placed in a super mixer and mixed for 10 minutes at an agitator rotation rate of 2,000 rpm to yield the silicone rubber particulate composition (samples 4 and 5, respectively). In addition, 100 parts of the liquid silicone rubber composition whose preparation is described above and 20 parts of ion-exchanged water containing surfactant as described above were milled in the colloid mill to prepare a silicone emulsion. This emulsion was aged at room temperature for 24 hours to give a water-based dispersion of silicone rubber powder. This water-based dispersion (120 parts) and 5 parts of the highly water-absorptive resin as described in Example 1 were placed in a super mixer and mixed for 10 minutes at an agitator rotation rate of 2,000 rpm to yield a silicone rubber particulate composition (sample 6). The water content, bulk density, and amount of static electricity were measured on each sample, and these results are reported in Table 2.

Comparative Example 3

One hundred parts Torayfil™ E506 and 11 parts of water were placed in a super mixer and mixed for 10 minutes at an agitator rotation rate of 2,000 rpm to give sample 7, which was submitted to measurement of its water content, bulk density, and amount of static electricity and inspection of its appearance. These results are reported in Table 2. However, as sample 7 took the form of a nonuniform mixture of lumps and powder, its bulk density could not be measured.

TABLE 2

| sample number | Example 2 4 | Example 3 5 | Example 4 6 | Comparative Example 3 7 |
|---|---|---|---|---|
| water-based dispersion of silicone rubber particulate (parts) | 111 | 111 | 120 | 0 |
| Torayfil ™ E506 (parts) | 0 | 0 | 0 | 100 |
| water (parts) | 0 | 0 | 0 | 11 |
| highly water-absorptive resin particulate (parts) | 0.5 | 1 | 5 | 0 |
| water content (%) | 7.1 | 7.5 | 7.2 | 6.8 |
| bulk density (g/cc) | 0.50 | 0.53 | 0.44 | could not be measured |
| amount of static electricity (kV) | 0 | 0 | 0 | 0 |
| appearance | flowable white powder | flowable white powder | flowable white powder | white, nonuniform mixture |

That which is claimed is:

1. A method for preparing a silicone rubber particulate composition, said method comprising mixing:
    (A) a water-based dispersion of a silicone rubber particulate, the particles of said particulate having an average size of 0.1 to 1000 μm, with
    (B) a water-absorptive resin particulate having a water-free average particle size of 0.1 to 1000 μm,
wherein the proportion of said component (B) measured on a water-free basis is from 0.01 to 5 weight percent relative to component (A) and said water is present at a level of 10 to 10,000 weight parts for each 100 weight parts of component (B).

2. A method for preparing a silicone rubber particulate composition, said method comprising mixing:
(A) a silicone rubber particulate, the particles of said particulate having an average size of 0.1 to 1000 μm;
(B) a water-absorptive resin particulate having a water-free average particle size of 0.1 to 1000 μm; and
(C) water, wherein the proportion of said component (B) measured on a water-free basis is from 0.01 to 5 weight percent relative to component (A) and said water is present at a level of 10 to 10,000 weight parts for each 100 weight parts of component (B).

* * * * *